US00RE36584E

United States Patent [19]

Härkönen et al.

[11] E Patent Number: Re. 36,584

[45] Reissued Date of Patent: Feb. 29, 2000

[54] METHOD FOR CONTROLLING A VACUUM CLEANER OR A CENTRAL VACUUM CLEANER

[75] Inventors: Jouko Härkönen; Reino Mustalampi, both of Verkkoniemi, Finland

[73] Assignee: Lindsay Mfg, Inc., Ponca City, Okla.

[21] Appl. No.: 07/699,952

[22] Filed: May 14, 1991

Related U.S. Patent Documents

Reissue of:

[64] Patent No.: 4,829,696
Issued: May 16, 1989
Appl. No.: 07/118,468
Filed: Nov. 9, 1987

U.S. Applications:

[63] Continuation-in-part of application No. 06/945,963, Dec. 24, 1986, abandoned.

[30] Foreign Application Priority Data

Oct. 1, 1986 [FI] Finland ..... 863965

[51] Int. Cl.[7] ..... A47L 5/38

[52] U.S. Cl. ..... 15/314; 15/319; 406/15

[58] Field of Search ..... 236/51; 15/314, 15/319, 339; 417/43; 406/15; 367/82, 197, 199

[56] References Cited

U.S. PATENT DOCUMENTS

| | | | |
|---|---|---|---|
| 3,382,524 | 5/1968 | Sandstrom | 15/314 |
| 3,669,145 | 6/1972 | Holstrom | 15/319 X |
| 3,753,221 | 8/1973 | Stevens | 367/197 |
| 3,814,542 | 6/1974 | Iglesias et al. | 406/15 X |
| 4,225,272 | 9/1980 | Palmovist | 406/15 |
| 4,382,543 | 5/1983 | Morrison | 236/51 X |

*Primary Examiner*—William Wayner
*Attorney, Agent, or Firm*—Wm Bruce Day

[57] ABSTRACT

The invention relates to a method of control for a device such as a vacuum cleaner or a central vacuum cleaner comprising a central machinery and a pipe or a pipe system connecting the central machinery with a working point. In order to avoid the installation of control conductors connecting the working points with the central machinery, the operation of the central machinery is controlled according to the invention in a wireless manner by means sound or pressure impulses transmitted from the working point to a receiving sensor using the pipe or the pipe system of the device as a transmission channel, whereby for the start-up of the central machinery, sound or pressure impulses are transmitted from the working point; said impulses are detected with an acoustic sensor; and the central machinery is started in response to the detection of the acoustic sensor, and for the stopping of the central machinery, the flow in the pipe system is blocked; the stopping of the flow is detected by means of a flow sensor; and the central machinery is stopped in response to the detection of the flow sensor.

32 Claims, 3 Drawing Sheets

METHOD FOR CONTROLLING A VACUUM CLEANER OR A CENTRAL VACUUM CLEANER

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of U.S. patent application Ser. No. 945,963, filed Dec. 24, 1986, now abandoned.

FIELD OF THE INVENTION

This invention relates to a method for controlling a vacuum cleaner or a central vacuum cleaner comprising a central machinery and a pipe or a pipe system connecting said central machinery with the working point, in which method the central machinery is controlled in a wireless manner using the pipe or the pipe system of the device as a transmission channel.

BACKGROUND ART

Traditionally the starting and stopping operations of vacuum cleaners and central vacuum cleaners are carried out by means of switches positioned in connection with the vacuum cleaner, or in the case of a central vacuum-cleaning system, in connection with the suction boxes. In some cases, a conductor is attached to the vacuum cleaner hose so that the switch is within easy reach for the user. In all these cases, the control signals to the central unit of the central vacuum-cleaning system have to be transmitted electrically through fixed electric conductors. With central vacuum cleaning systems, the installation of such conductors causes considerable planning, installation and material costs.

Another problem with prior devices is that the user has to go to the switch in order to start or stop the device. Particularly when in a hurry, e.g. when the telephone is ringing, this is sometimes found inconvenient. Furthermore, the vacuum cleaner hose or the hose of the central vacuum-cleaning system is expensive, heavy and difficult to handle when the conductor is attached thereto. The conductor is also easily damageable in use.

U.S. Pat. No. 4,382,543, in turn, discloses a method for controlling a central unit, in the case of said publication a central heating furnace, with sound or pressure impulses transferred from individual radiators through a return line of a pipe system attached thereto to the vicinity of the heating boiler to be used for the control thereof. Such a method cannot, however, be used for stopping the central unit in connection with a central vacuum cleaning system. This is because of two reasons. Firstly, as sound does not propagate in a vacuum, it is also affected by the variation in the underpressure created by the suction in the vacuum cleaner pipe, and this kind of variation occurs always during vacuum-cleaning. In addition, the vacuum-cleaning air and the rubbish moving within the pipe create varying sounds to such an extent that the use of sound for stopping is unreliable if not impossible.

SUMMARY OF THE INVENTION

The object of the present invention is to provide a new method of control for devices of the above kind, by means of which method the above-mentioned problems can be substantially avoided. In the method of control according to the invention this is achieved so that for the start-up of the central machinery, sound or pressure impulses are transmitted from the working point, said impulses are detected with an acoustic sensor, and the central machinery is started in response to the detection of the acoustic sensor, and that for stopping the central machinery the flow in the pipe system is blocked, the stopping of the flow is detected by means of a flow sensor, and the central machinery is stopped in response to the detection of the flow sensor. The central machinery is preferably stopped in response to the indication of the flow sensor after a predetermined time delay. It is further to be preferred that for stopping the central machinery the pipe system is closed by means of a flap arranged in the handle of the suction hose of the device.

It has been found out that the frequency of the sound or pressure impulses used for the start-up is preferably relatively low, at least within the sound range, i.e. within the frequency range of 0 to 20,000 Hz. Frequencies beyond this range, e.g. ultrasonic frequencies, do not any more propagate sufficiently efficiently within the pipe system. This is assumed to be due to the fact that the higher the frequency of the signal, the more directive the signal is. Consequently, low frequencies are easier to pass through a pipe system which may comprise even sharps bends.

On the contrary, sound impulses are not suitable for stopping the apparatus, because it is alsmost impossible to provide a reliable indication of sound impulses in the central machinery because of the pressure variation in the suction pipe system and the suction sounds caused by the rubbish advancing in the pipe system. However, all extremely reliable stopping can be provided by means of a flow sensor positioned in the vicinity of the central machinery and responsive to the blocking of the pipe system. This kind of blocking can be effected e.g. by means of a flap positioned in the handle or by closing the cover of the suction box after the suction hose has been detached.

BRIEF DESCRIPTION OF THE DRAWING

In the following the method of control according to the invention will be described in more detail in connection with a specific central vacuum-cleaning system, with reference to the attached drawing, wherein.

DESCRIPTION OF THE PREFERRED EMBODIMENTS

Figure 1:
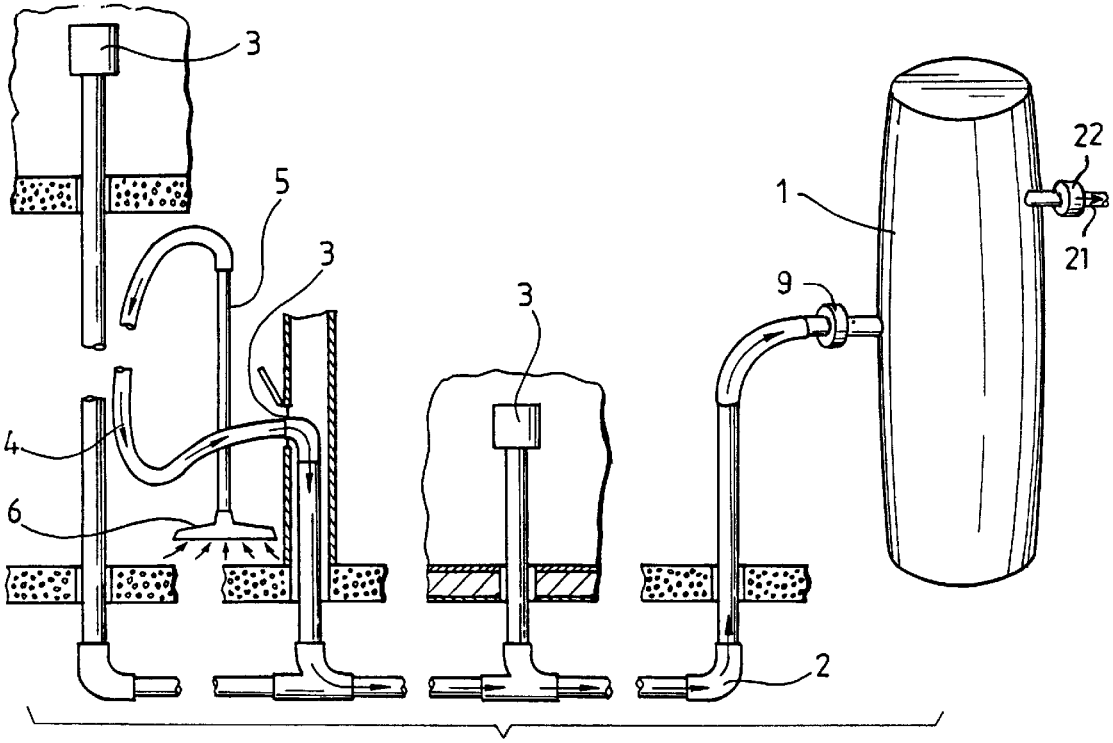
FIG. 1 illustrates generally the structure of a central vacuum-cleaning system according to the invention.

FIG. 1 illustrates generally the structure and operation of a central vacuum-cleaning system. It comprises a central unit 1 which is positioned in a suitable space wherefrom an exhaust air pipe 21 can be drawn directly outdoors. The central unit 1 is provided with a system of suction pipes 2 which is mounted stationarily within the floor, wall and ceiling structures of the building. This suction pipe system 2 reaches the different rooms to be vacuum-cleaned by means of separate branches at the ends of which so-called suction boxes 3 are provided for each room. A suction hose 4 is shown as attached to one of the suction boxes, and a handle 5 with a nozzle 6 is attached to the end of the hose.

It has previously been necessary to install a low-voltage conductor between each suction box 3 and the central unit in order that the unit could be started e.g. when the cover of the suction box is opened. In the method according to the invention, all such low-voltage conductors can be left out, which decreases considerably the material and installation costs of the device. This is possible because, in the method of control according to the invention, the central unit is controlled by means of sound or pressure impulses which are transmitted from a sender positioned e.g. in the handle through the suction pipe system to the central unit. In other words, the suction pipe system itself is used as a signal channel. Practical tests have shown that a suction pipe system is very well suited for the transmission of sound and pressure impulses, provided that the impulses have a suitable frequency. Such a frequency range would be e.g. the range of sound, i.e. the frequency range of 0 to 20 kHZ. The frequency of 16 Hz has proved to be advantageous. However, the frequency or the frequency range to be used naturally depends on the operations to be controlled. If the central unit is only to be switched on and off, as is usual in systems presently in use, one frequency, e.g. the above frequency of 16 Hz, is enough for starting the vacuum-cleaner. The stopping of the vacuum-leaner, in turn, is carried out by blocking the suction hose e.g. by means of a flap positioned in the handle.

Figure 2:
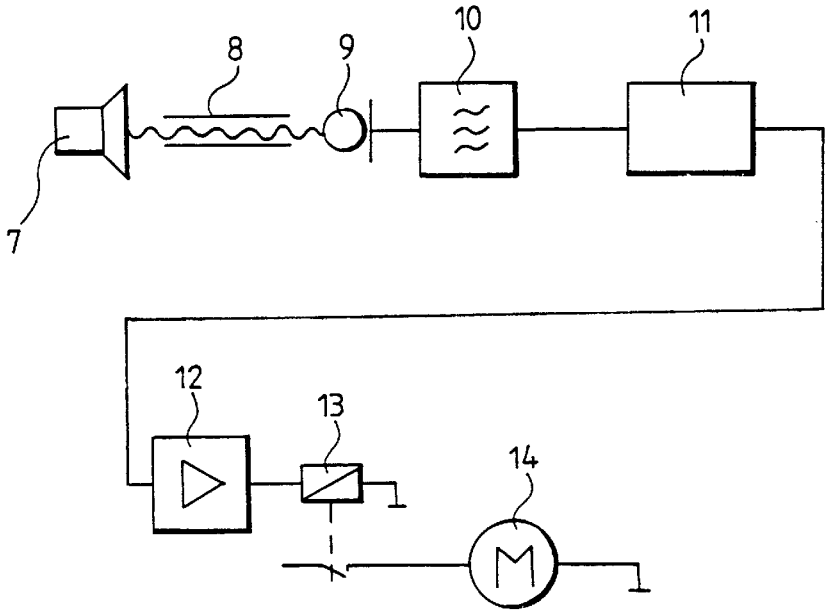
FIG. 2 is a schematical view of the operating principle of the method of control according to the invention.

FIG. 2 illustrates generally the operation of the method of control according to the invention as a block diagram at the start-up of the central machinery. The reference numeral 7 indicates a pressure or sound source by means of which the user can send a suitable control impulse to a transmission channel 8 which, according to the invention, is formed by a pipe or a pipe system connecting the working point and the central machinery of the device. A sensor 9 receiving the pressure or sound impulses is positioned e.g. in a central vacuum-cleaner system or a vacuum cleaner in connection the central machinery, whereas it may be necessary in larger central cleaning systems to position the sensor, or possibly a plurality of sensors, at strategical points of the pipe system. In this way the signal conductors between the working point and the central machinery can be omitted, either all of them or at least most of them. From the sensor 9, either a pressure sensor or a microphone-type receiver, the impulses are passed in electrical form to a filter 10 which can be e.g. of the band pass type and which filters a desired band from the signal to be further transferred to a detector 11 which detects the presence of a control signal having the desired frequency in the signal from the filter 10. After the detector 11 has detected the presence of the control signal, the output signal of the detector 11 effects the pick-up of a relay 13 through a controller 12 for switching on an operating device 14. The operating device 14 can be e.g. the motor of the central unit of the central vacuum-cleaning system.

The central unit, in turn, is stopped by closing the suction pipe system e.g. by means of a flap positioned in the handle or by blocking the cover of the suction box after the suction hose has been detached. The blocking of the suction pipe system causes a substantial decrease in the air flow within the pipe system, which is easily detectable by means of a suitable flow sensor. This kind of flow sensor 22 is preferably positioned in the exhaust pipe 21 of the central unit (FIG. 1) and it may comprise e.g. a flap which swings into a position closing the exhaust pipe when the air flow is stopped. The position of the closing flap can be reliably controlled from outside the exhaust pipe by means of a magnetic sensor from which a message of the closing of the flap is passed on to the central machinery after a determined time delay for stopping the central machinery. Such a predetermined time delay is necessary in order that pressure variations and temporary blockages in the suction pipe would not cause the stopping of the the central machinery. A blockage of a more permanent kind in the suction pipe, instead, stops the central machinery, which increases the operating safety of the device.

Figure 3:
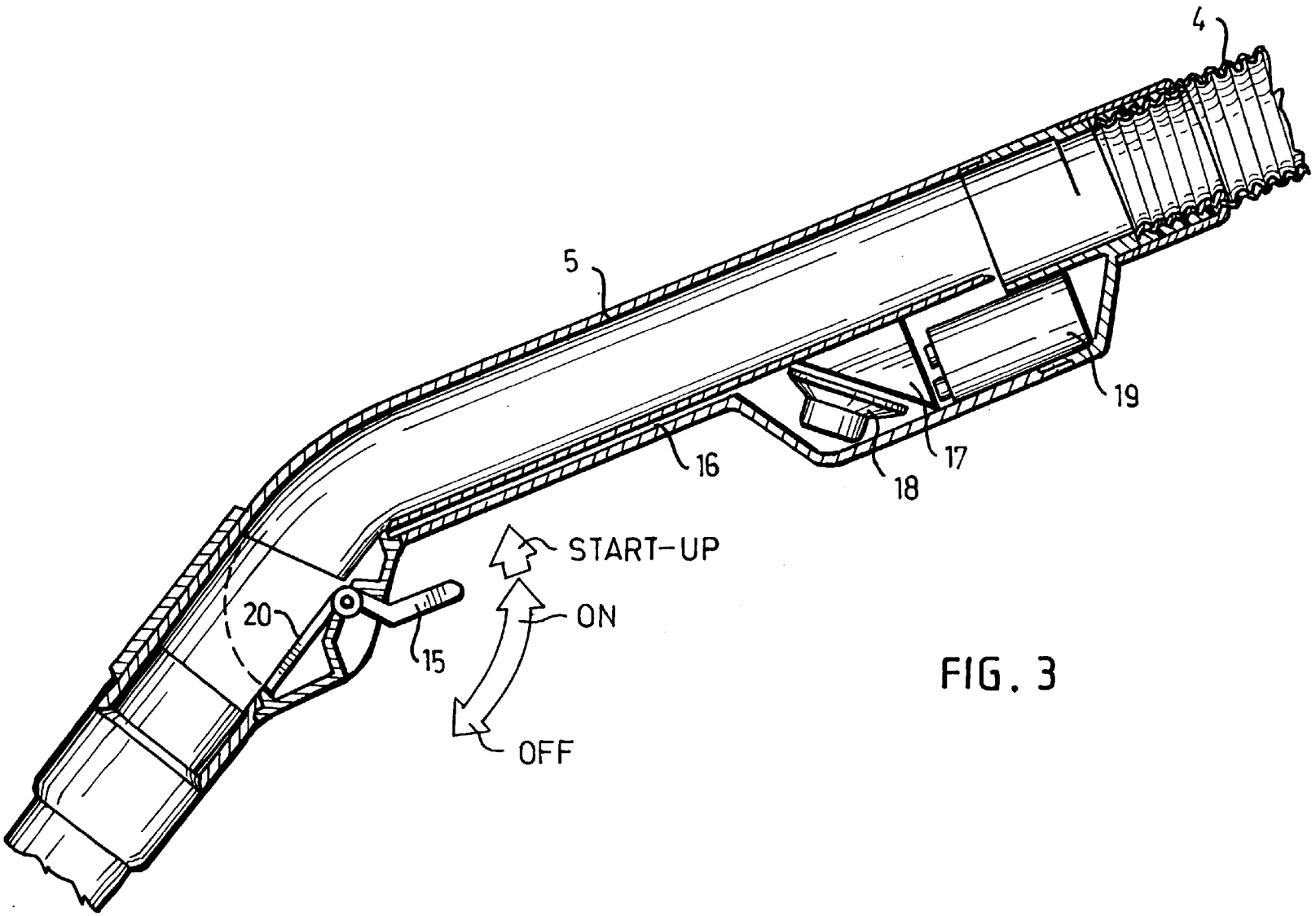
FIG. 3 shows an example of a handle in which the method according to the invention has been applied.
Figure 4:
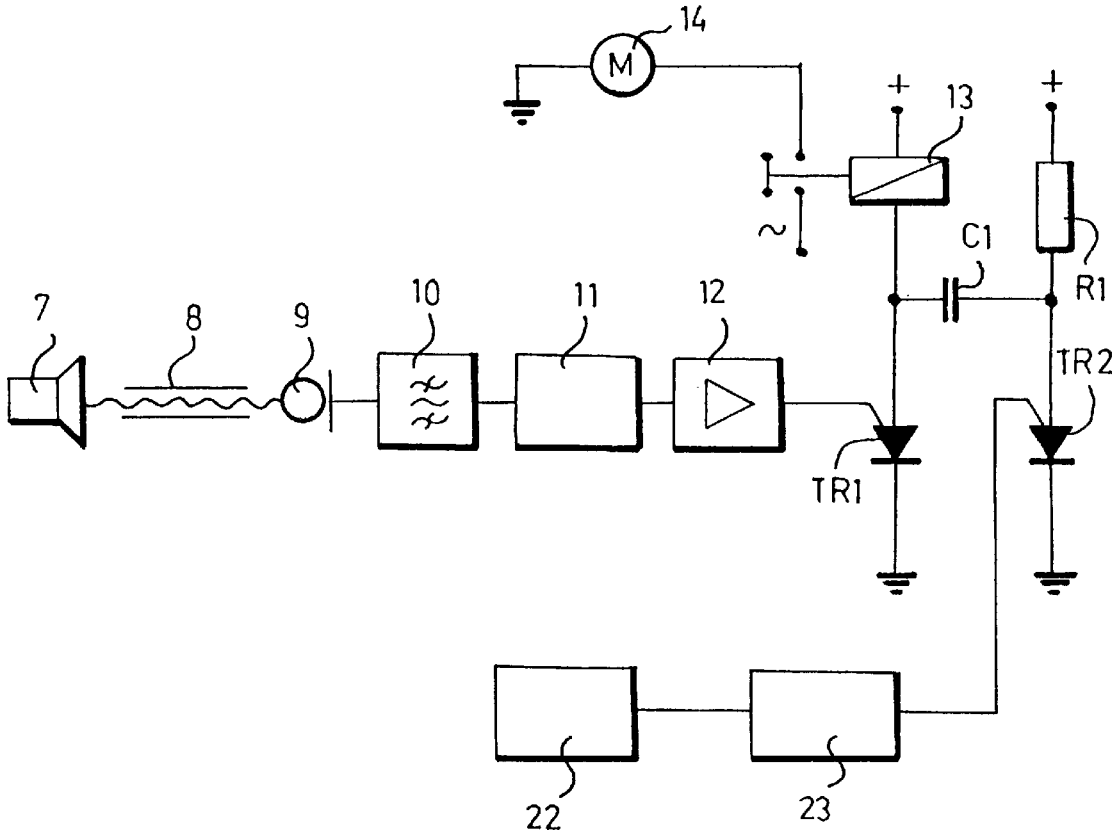

FIG. 3 shows an example of a handle 5 and means attached thereto to be used for starting and stopping the central machinery when applying the method according to the invention. For the start-up, the handle 5 is provided with an operating lever 15. When the lever is pressed towards the handle 5, current is connected to a signal generator 17 through a conductor arranged in a conductor groove 16, and the signal generator creates start-up sound impulses in the suction pipe 4 by means of a loudspeaker 18, wherefrom the impulses are passed on to the central machinery. The signal generator obtains current from a battery 19. For stopping the central machinery, the operating lever 15 is further provided with a closing flap 20 which is caused to close the suction pipe when the operating lever 15 is pressed in a direction away from the handle 5. The operating positions of the operating lever 15 are indicated in FIG. 3 by means of arrows and respective terms "start-up", "on" and "off".

The invention has been described above by means of a specific central vacuum-cleaning system. A fully similar control system can be used e.g. for a conventional vacuum-cleaner.

Suitable senders for applying the method of control according to the invention include various sound sources, either mechanical or electronical as in the example of FIG. 3 in their operating principle. Mechanical sound or pressure impulse sources can be formed e.g. by different kinds of signalling horns or a flap for blocking the suction pipe system. Electrical sound sources, in turn, include different kinds of oscillatory circuits combined with a suitable loudspeaker. In principle, the structure or the operating principle of the sound source are not relevant to the invention, provided that the frequency of the produced sound is as required and possibly adjustable if the power supplied to the central machinery, too, is to be controlled by means of sound or pressure impulses. The structure of the receiving sensors does not, either, have any greater importance with respect to the invention. This is because the basic idea of the invention is to control a central machinery in a wireless manner by means of sound and pressure impulses using the pipe or the pipe system between the central machinery and the working point as a transmission channel. In connection with central vacuum-cleaning systems in particular, this kind of method of control offers substantial advantages over prior methods of control which necessarily require that at least low voltage conductors are drawn in the vicinity of each working point from which the system is to be controlled.

We claim:

1. A method for controlling a central vacuum cleaner comprising a central machinery and a pipe system connecting said central machinery with a working point, in which method the central machinery is controlled in a wireless manner using the pipe system of the device as a transmission channel, comprising for the start-up of the central machinery the steps of transmitting sound or pressure impulses from the working point;

detecting said impulses with an acoustic sensor; and starting the central machinery in response to the detection of the acoustic sensor;

and for the stopping of the central machinery the steps of blocking the flow in the pipe system;

detecting the stopping of the flow by means of a flow sensor; and stopping the central machinery in response to the detection of the flow sensor.

2. A method of control according to claim 1 wherein the central machinery is stopped in response to the detection of the flow sensor after a predetermined time delay.

3. A method of control according to claim 1, wherein for the stopping of the central machinery the pipe system is blocked by means of a flap positioned in a handle of a suction pipe of the device.

4. A method of control according to claim 1, wherein the acoustic sensor is positioned in connection with the central machinery.

5. A method of control according to claim 1, wherein the sound or pressure impulses for starting the central machinery are sent from said handle of the suction pipe of the device.

6. A method of control according to claim 1, wherein the frequency of the sound or pressure impulses starting the central machinery is within the range of 0 to 20,000 Hz.

7. A method of control according to claim 1, wherein said flow sensor is positioned in connection with the central machinery.

8. A system for controlling a central vacuum cleaner comprising a central machinery and a pipe arrangement connecting said central machinery with a working point, said central machinery being controlled in a wireless manner using the pipe arrangement as a transmission channel, comprising:

means for transmitting sound or air pressure impulses from the working point to start up said central machinery;

means including a sensor for detecting said impulses;

means responsive to said detection means for starting said central machinery in response to the detection of energy by said sensor;

means for stopping of said central machinery including means for blocking the flow of air in said pipe arrangement;

means including an air flow sensor for detecting the stopping of the flow of the air in said pipe by said flow sensor; and means for stopping said central machinery in response to the detection of air flow stoppage in said pipe by said flow sensor.

9. The system according to claim 8, including time delay means coupled with said central machinery for stopping thereof in response to the detection by said flow sensor after a predetermined time delay of the air flow stoppage in said pipe.

10. The system according to claim 8, wherein said stopping means includes a flap operatively associated with said pipe arrangement.

11. The system according to claim 8, wherein said stopping means includes a handle coupled with said pipe arrangement and a flap in said handle for cutting off air flow through said handle.

12. The system according to claim 8, wherein said acoustic sensor is positioned in a connection with said central machinery.

13. The system according to claim 11, wherein said acoustic sensor is positioned in said handle.

14. The system according to claim 11, wherein the sound or pressure impulses for starting said central machinery are sent from said handle through said transmission channel to said central machinery.

15. The system of claim 11, wherein said transmission channel is a suction channel to which said handle is connectable, and said flap in said handle controls the sending of sound or pressure impulses to said central machinery for starting thereof.

16. The system according to claim 8, wherein the frequency of the sound or pressure impulses starting the central machinery is within the range of 0 to 20,000 Hz.

17. The system of claim 11, wherein the sound or pressure impulses is within the range of 0 to 20,000 Hz.

18. The system of claim 8, wherein the sound or pressure impulse is 16 Hz.

19. The system according to claim 8, wherein said air flow sensor is connected with said central machinery.

20. The system of claim 8, wherein said last-mentioned stopping means includes a swingable flap controllable from outside said pipe arrangement.

*21. A method for controlling a central vacuum cleaner comprising a central machinery and a pipe system connecting said central machinery with a working point, in which method the central machinery is controlled in a wireless manner using the pipe system of the device as a transmission channel for sound waves in the air inside, comprising for the start up of the central machinery the steps of:*

*a) transmitting low frequency sound in the area of 16 Hz from the working point;*

*b) by detecting said sound with an acoustic sensor; and*

*c) starting the central machinery in response to the detection of the acoustic sensor.*

*22. A method for controlling a central vacuum cleaner comprising a central machinery and a pipe system connecting said central machinery with a working point, in which method the central machinery is controlled in a wireless manner using the pipe system of the device as a transmission channel, comprising for the stopping of the central machinery the steps of:*

*a) blocking the flow in the pipe system;*

*b) detecting the stopping of the flow by means of a flow sensor; and*

*c) stopping the central machinery in response to the detection of the flow sensor.*

*23. A system for controlling, a central vacuum cleaner comprising a central machinery and a pipe arrangement connecting said central machinery with a working point and including a flexible suction hose with a handle wand, said central machinery being controlled in a wireless manner using the pipe arrangement as a transmission channel for sound waves in the air inside, comprising:*

*a) means for transmitting low frequency sound in the area of 16 Hz from the working point to start up said central machinery, said means for transmitting being located within said handle wand and transmitting said sound through said hose and said pipe arrangements;*

*b) a sensor for detecting said sound;*

*c) means responsive to said detection means for starting said central machinery in response to the detection of said low frequency sound by said sensor.*

*24. A system for controlling a central vacuum cleaner comprising a central machinery and a pipe arrangement connecting said central machinery with a working point, said central machinery being controlled in a wireless manner using the pipe arrangement as a transmission channel, comprising:*

*a) means for stoppling of said central machinery including means for blocking the flow of air in said pipe arrangement;* b) means including an air flow sensor for detecting the stopping of the flow of the air in said pipe by said air flow sensor; and c) means for stopping said central machinery in response to the detection of air flow stoppage in said pipe by said flow sensor.

25. A method for controlling a central vacuum cleaner comprising a central machinery and a pipe system having a plurality of sharp bends and providing an air channel connecting said central machinery with a working point, comprising the steps of controlling the central machinery in a wireless manner by transmitting a control signal of low frequency sound in the area of 16 Hz through the air and around said sharp bends in said pipe system receiving the control signal and actuating said central machinery in response to said control signal.

26. A system for controlling a central vacuum cleaner comprising a central machinery and a pipe arrangement having a plurality of sharp bends and connecting said central machinery with a working point, said central machinery being controlled in a wireless manner using the pipe arrangement as a transmission channel for sound waves in the air inside, comprising:

a) means for transmitting low frequency sound in the area of 16 Hz from the working point through said pipe arrangement and around said sharp bends to start up said central machinery;

b) a sensor for detecting said sound; and c) means responsive to said detection means for starting said central machinery in response to the detection of said sound by said sensor.

27. A system for controlling a central vacuum cleaner comprising a central machinery and a pipe arrangement having a plurality of sharp bends and connecting said central machinery with a working point, said central machinery being controlled in a wireless manner using the pipe arrangement as a transmission channel for sound waves in the air inside, comprising:

a) means for transmitting low frequency sound in the area of 16 Hz from the working point through said pipe arrangement and around said sharp bends to start up said central machinery, said means for transmitting being an acoustic sound transmitter positioned within said pipe arrangement;

b) a sensor for detecting said sound; and c) means responsive to said detection means for starting said central machinery in response to the detection of said sound by said sensor.

28. A system for controlling a central vacuum cleaner comprising a central machinery and a Pipe system having a plurality of sharp bends and connecting said central machinery with a working point, in which system the central machinery is controlled in a wireless manner using the pipe system as a transmission channel for sound waves in the air inside, comprising:

a) means for transmitting low frequency sound within human sound range and which is sufficiently low so as to pass through the air in a pipe system which may have sharp bends, said sound traveling from a working point through the pipe system to start up said central machinery;

b) a sensor for detecting said sound; and c) means responsive to said detection means for starting said central machinery in response to the detection of said sound by said sensor.

29. A system for controlling a central vacuum cleaner comprising a central machinery having a motor and a pipe system having a plurality of sharp bends and connecting said central machinery with a working point, in which system the central machinery is controlled in a wireless manner using the pipe system as a transmission channel for sound waves in the air inside, comprising:

a) means for transmitting low frequency sound within human sound range and which is sufficiently low so as to pass through the air in a Pipe system which may have sharp bends, said means having a capability for adjusting the frequency of said low frequency sound for controlling power supplied to the motor of said central machinery, said sound traveling from a working point through the pipe system to start up said central machinery;

b) a sensor for detecting said sound; and c) means responsive to said detection means for starting said central machinery in response to the detection of said sound by said sensor.

30. A system for controlling a central vacuum cleaner comprising a central machinery having a motor and a pipe system having a plurality of share bends and connecting said central machinery with a working point, in which system the central machinery is controlled in a wireless manner using the pipe system as a transmission channel for sound waves in the air inside, comprising:

a) means for transmitting low frequency sound well below 20,000 Hz and within human sound range and which is sufficiently low infrequency so as to pass through the air in a pipe system which may have sharp bends, said sound traveling from a working point through the sine system to start up said central machinery;

b) a sensor for detecting said sound; and c) means responsive to said detection means for starting said central machinery in response to the detection of said sound by said sensor.

31. A system for controlling a central vacuum cleaner comprising a central machinery having a motor and a pipe system having a plurality of sharp bends and connecting said central machinery with a working point, in which system the central machinery is controlled in a wireless manner using the pipe system as a transmission channel for sound waves in the air inside, comprising:

a) means for transmitting low frequency sound within the range of audible sound and well below the ultrasonic range, and which is sufficiently low infrequency so as to sass through the air in a pipe system which may have sharp bends, said sound traveling from a working point through the pipe system to start up said central machinery;

b) a sensor for detecting said sound; and c) means responsive to said detection means for starting said central machinery in response to the detection of said sound by said sensor.

32. A system for controlling a central vacuum cleaner comprising a central machinery having a motor and a pipe system having a plurality of share bends and connecting said central machinery with a working point, in which system the central machinery is controlled in a wireless manner using the pipe system as a transmission channel for sound waves in the air inside, comprising:

a) means for transmitting low frequency sound within the range of audible sound and well below the ultrasonic range and of a selected frequency low enough to allow

*the pipe system to act as a signal channel that permits the signal to propagate with sufficient energy that said signal can be detected near the central machinery after transmitting around said many sharp bends, said sound traveling from a working point through the pipe system to start up said central machinery;*

*b) a sensor for detecting said sound; and*

*c) means responsive to said detection means for starting said central machinery in response to the detection of said sound by said sensor.*

* * * * *